United States Patent
Nagasaka

(10) Patent No.: US 7,777,913 B2
(45) Date of Patent: Aug. 17, 2010

(54) IMAGE READING APPARATUS, FACSIMILE APPARATUS AND COPYING APPARATUS

(75) Inventor: Hideaki Nagasaka, Nagoya (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 333 days.

(21) Appl. No.: 11/939,943

(22) Filed: Nov. 14, 2007

(65) Prior Publication Data

US 2008/0309958 A1  Dec. 18, 2008

(30) Foreign Application Priority Data

Nov. 15, 2006  (JP) ............................. 2006-309330

(51) Int. Cl.
G06K 15/22 (2006.01)
H04N 1/46 (2006.01)
H04N 1/04 (2006.01)
G03G 15/04 (2006.01)

(52) U.S. Cl. ..................... 358/1.3; 358/1.9; 358/505; 358/509; 358/514; 358/530; 358/475; 399/31; 399/32

(58) Field of Classification Search ............. 358/1.3, 358/509, 1.9, 475, 510, 505, 514, 520, 518, 358/1.13, 513, 530, 480, 504, 512; 382/162, 382/163, 164; 345/175, 156, 173, 178, 179; 399/32, 31

See application file for complete search history.

(56) References Cited

U.S. PATENT DOCUMENTS

| 5,580,045 A * | 12/1996 | Matsumoto et al. ......... 271/298 |
| 6,587,099 B2 * | 7/2003 | Takekawa .................... 345/175 |
| 7,616,359 B2 * | 11/2009 | Sekizawa et al. ............ 358/509 |
| 2005/0094215 A1 | 5/2005 | Nagasaka |

FOREIGN PATENT DOCUMENTS

| JP | H06-78147 A | 3/1994 |
| JP | H10-210243 A | 8/1998 |
| JP | H10-215343 A | 8/1998 |
| JP | 2005-136640 A | 5/2005 |

OTHER PUBLICATIONS

Japan Patent Office; Notice of Reason(s) for Rejection in Japanese Patent Application No. 2006-309330 (counterpart to the above-captioned U.S. patent application) mailed Jun. 30, 2009.
Japanese Patent Office, Notice of Reason(s) for Rejection for Japanese Patent Application No. 2006-309330, mailed Sep. 9, 2008. (counterpart of above-captioned U.S. patent application.).

* cited by examiner

*Primary Examiner*—Edward L Coles
*Assistant Examiner*—Charlotte M Baker
(74) *Attorney, Agent, or Firm*—Baker Botts L.L.P.

(57) ABSTRACT

An image reading apparatus includes a plurality of light emitting units, an activation unit, a plurality of light receiving units and a determination unit. The determination unit retrieves at least one output signal from the plurality of light receiving units in accordance with a predetermined retrieving procedure each time each of the plurality of light emitting units is activated, and determines, based on the at least one output signal, whether or not at least one of at least one of the plurality of light emitting units and at least one of the plurality of light receiving units is normal. The predetermined retrieving procedure is configured such that at least one output signal is retrieved from a part of the plurality of light receiving unite in response to an activation of at least one of the plurality of light emitting units.

19 Claims, 16 Drawing Sheets

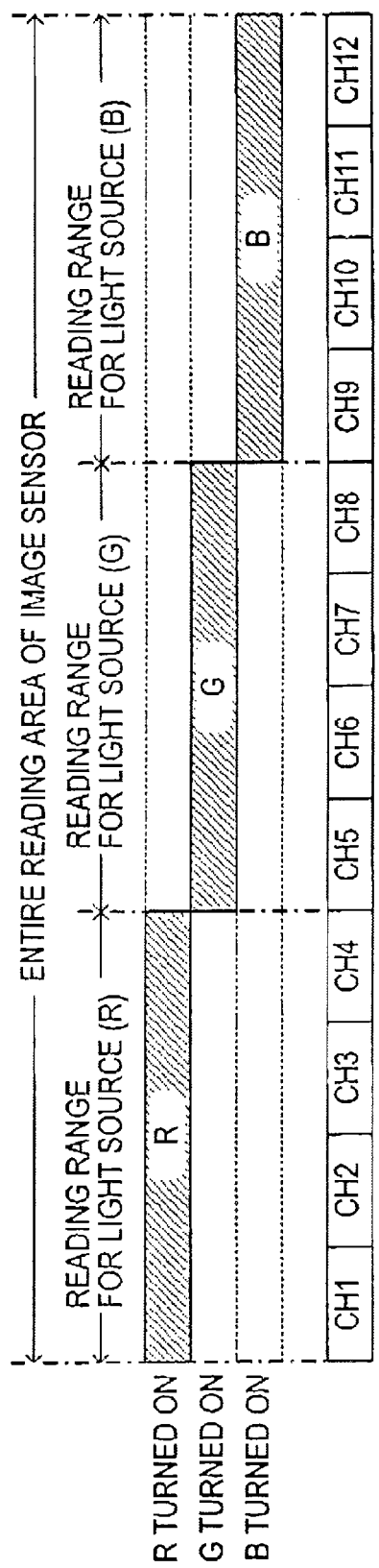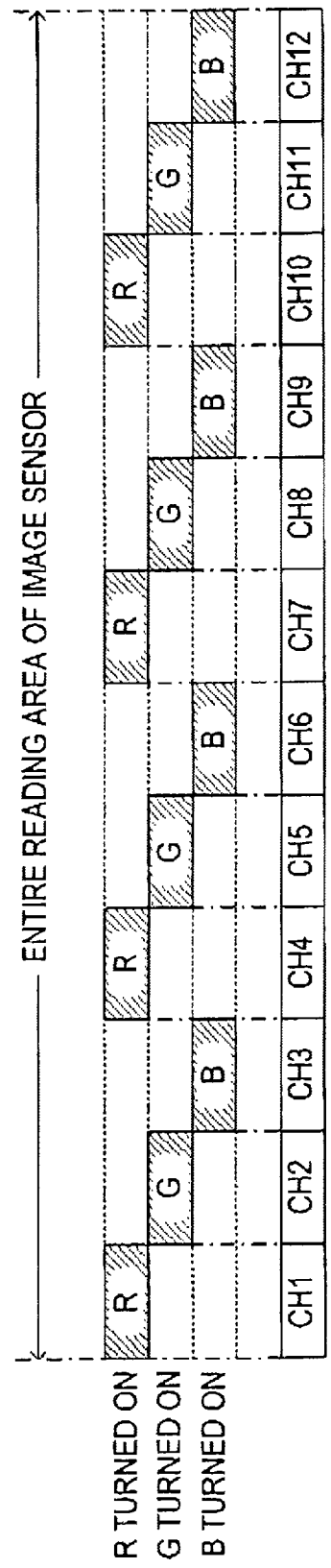

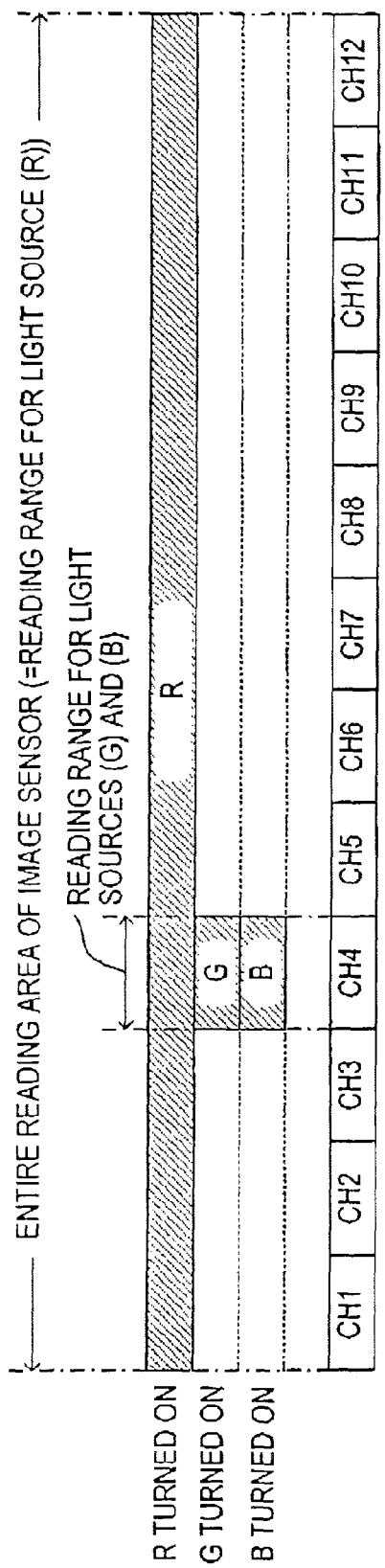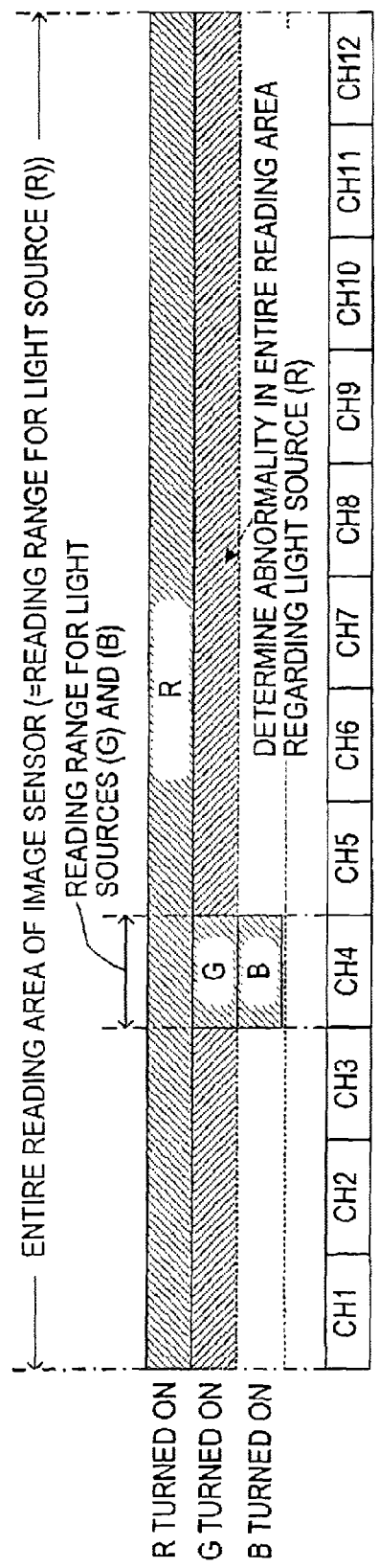

IMAGE READING APPARATUS, FACSIMILE APPARATUS AND COPYING APPARATUS

CROSS-REFERENCE TO RELATED APPLICATIONS

This application claims the benefit of Japanese Patent Application No. 2006-309330 filed Nov. 15, 2006 in the Japan Patent Office, the disclosure of which is incorporated herein by reference.

BACKGROUND

The present invention relates to an image reading apparatus in which lights from a plurality of light emitting units are irradiated to a reading target and reflected lights are received thereby to read an image, and to a facsimile apparatus and a copying apparatus each provided with the image reading apparatus.

There is a known image reading apparatus in which a light of a color is irradiated from a light emitting unit to a document as a reading target and a reflected light thereof is received by a plurality of light receiving units thereby to read an image from the document.

Also, it is proposed regarding an image reading apparatus of this type to irradiate a light of a color from a light emitting unit to a target for testing, receive output signals from all light receiving units, and analyze the output signals, thereby to determine whether or not the light emitting unit and all the light receiving units are operating in a normal manner.

SUMMARY

There also is an image reading apparatus in which lights of a plurality of colors, such as R (red), G (green) and B (blue), are sequentially irradiated from a plurality of light emitting units, respectively, to a reading target. Each time a light of each of the colors is irradiated, output signals are received from all light receiving units, and thereby a color image is read in the image reading apparatus.

To determine whether or not all the light emitting units and all the light receiving units are operating in a normal manner in the image reading apparatus according to the above proposed technique, output signals are received from all the light receiving units each time each of the light emitting units is sequentially activated.

This leads to the following problem: A data amount received from the respective light receiving units is increased in proportion to a number of colors of lights used for reading an image, as compared with an image reading apparatus using a light of only one color. As a result, a processing load for performing the above determination is increased, and thus a required time for the determination is increased.

In a first aspect of the present invention, it is desirable that it is possible to determine, in a short time, whether or not at least one of at least one of a plurality of light emitting units and at least one of a plurality of light receiving units in an image reading apparatus is operating in a normal manner.

An image reading apparatus according to the first aspect of the present invention includes a plurality of light emitting units, an activation unit, a plurality of light receiving units and a determination unit.

Each of the plurality of light emitting units emits a light to irradiate a reading target with the light. The activation unit activates the plurality of light emitting units, respectively, in accordance with a predetermined order. Each of the plurality of light receiving units outputs an output signal when receiving a reflected light from the reading target. The determination unit retrieves at least one output signal from the plurality of light receiving units in accordance with a predetermined retrieving procedure each time each of the plurality of light emitting units is activated, and determines, based on the at least one output signal, whether or not at least one of at least one of the plurality of light emitting units and at least one of the plurality of light receiving units is normal. The predetermined retrieving procedure is configured such that at least one output signal is retrieved from a part of the plurality of light receiving units in response to an activation of at least one of the plurality of light emitting units.

In the image reading apparatus configured as above, not all output signals from all of the light receiving units are retrieved each time each of the plurality of light emitting units is activated, but at least one output signal is retrieved from a part of the plurality of light receiving units in response to an activation of at least one light emitting unit.

Thus, according to the image reading apparatus of the first aspect, it may be possible to determine, in a short time, whether or not at least one of at least one of the plurality of light emitting units and at least one of the plurality of light receiving units is normal.

A facsimile apparatus according to a second aspect of the present invention includes the image reading apparatus according to the first aspect and a transmitter that performs facsimile transmission of image data generated based on output signals from the plurality of light receiving units in the image reading apparatus. Thus, according to the facsimile apparatus, the same advantage as in the image reading apparatus according to the first aspect may be achieved.

The facsimile apparatus may also be configured, for example, such that the determination unit in the image reading apparatus is caused to determine whether or not at least one of at least one of the plurality of light emitting units and at least one of the plurality of light receiving units is normal at the time of facsimile transmission, and image reading by the image reading apparatus (and thus image transmission from the transmitter) is stopped when an abnormality is determined. Then, it may be possible to prevent facsimile transmission of an unclear image.

A copying apparatus according to a third aspect of the present invention includes the image reading apparatus according to the first aspect and an image forming apparatus that forms an image based on image data generated based on output signals from the plurality of light receiving units in the image reading apparatus. Thus, according to the copying apparatus, the same advantage as in the image reading apparatus according to the first aspect may be achieved.

BRIEF DESCRIPTION OF THE DRAWINGS

The invention will now be described below, by way of example, with reference to the accompanying drawings, in which:

FIG. 7A is an explanatory view showing an image data retrieving procedure corresponding to the reading determination process in FIG. 6;

FIG. 7B an explanatory view showing a modified example of the image data retrieving procedure in the first embodiment;

FIG. 11A is an explanatory view showing an image data retrieving procedure in a case where image data has been retrieved from all light receiving units in a normal manner when a light source of red (R) is on;

FIG. 11B is an explanatory view showing an image data retrieving procedure in a case where image data has not been retrieved from all light receiving units in a normal manner when the light source of red (R) is on;

DETAILED DESCRIPTION OF THE PREFERRED EMBODIMENTS

First Embodiment

<General Configuration of Multifunction Machine>

Figure 1:
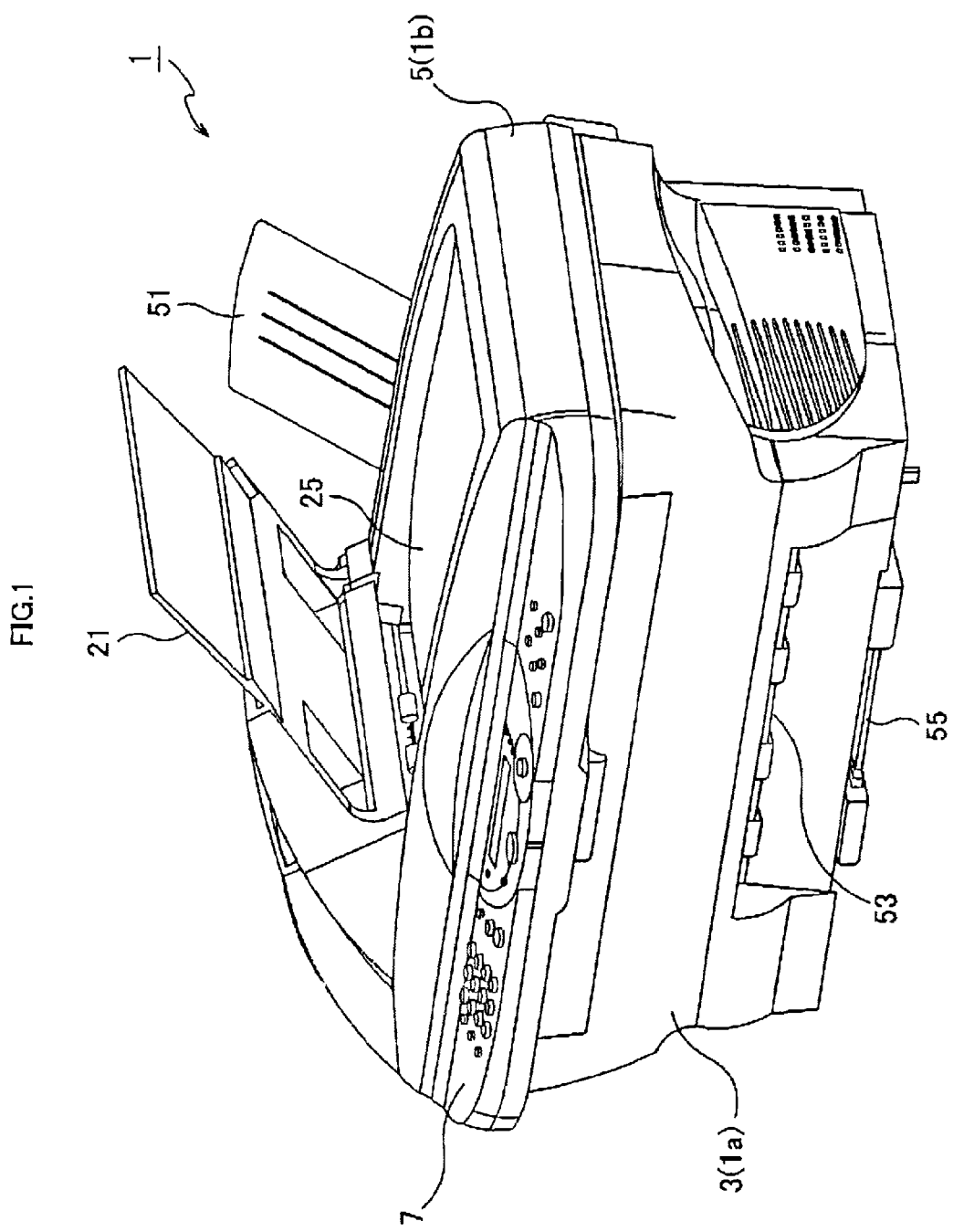
FIG. 1 is a perspective view showing a general configuration of a multifunction machine in a first embodiment.

A multifunction machine 1 in a first embodiment has an image scanner functions a printer function, a copier function and a facsimile function. As shown in FIG. 1, the multifunction machine 1 includes a clamshell-type open/close structure in which an upper main body 1b is attached to a lower main body 1a in an openable/closable manner. An image forming apparatus 3 (a laser printer in the first embodiment) is incorporated in the lower main body 1a and an image reading apparatus 5 is incorporated in the upper main body 1b. An operation panel 7 is provided in a front portion of the upper main body 1b.

The image reading apparatus 5 is an image reading apparatus of a type having both a flatbed mechanism (hereinafter also referred to as the "FB") and an Automatic Document Feeder mechanism (hereinafter also referred to as the "ADF"). The FB is for reading an image from a document in a placed state, and the ADF is for reading an image while conveying a document to an image reading position.

Figure 2:
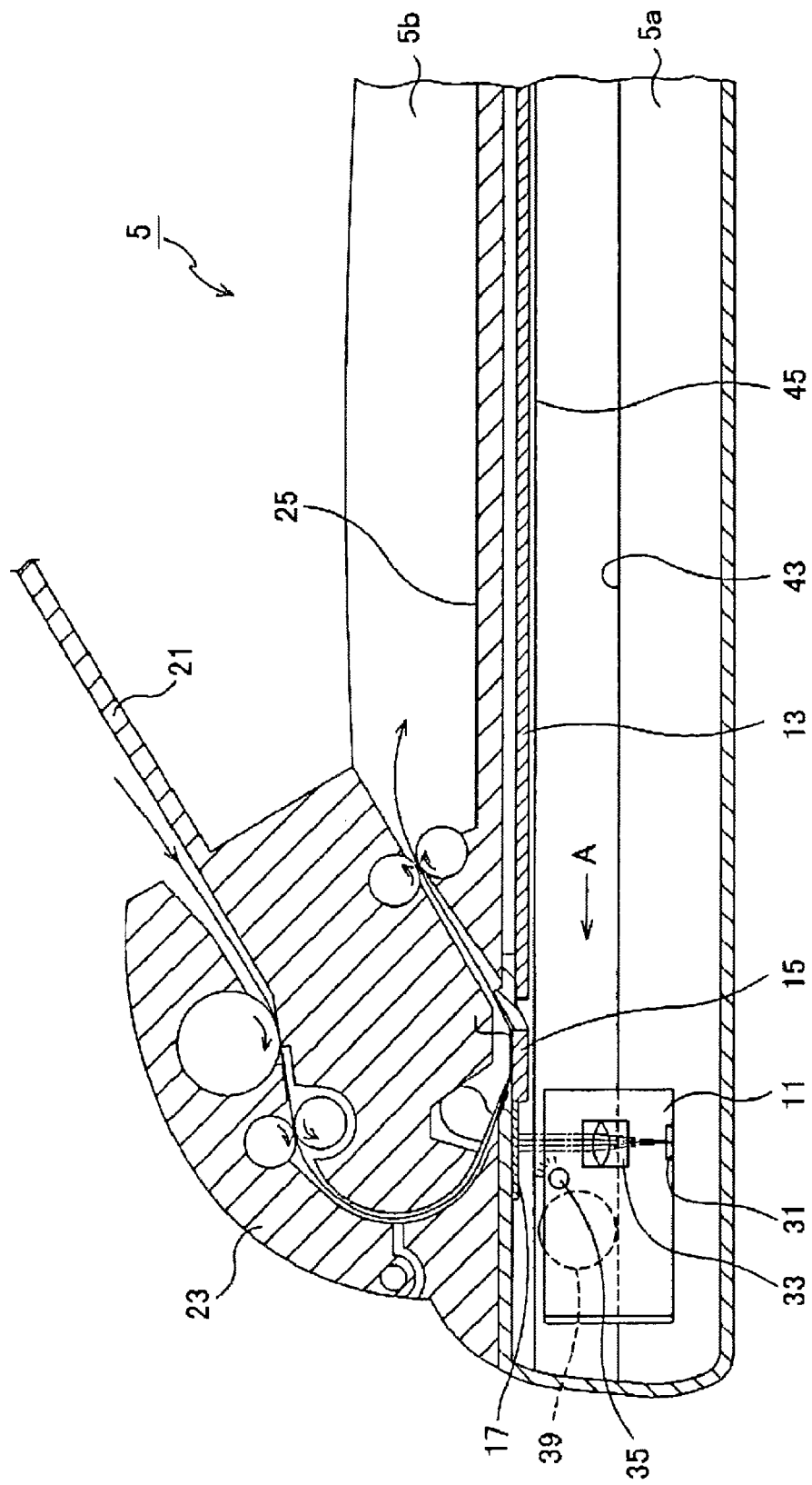
FIG. 2 is a cross-sectional view showing a configuration of an image reading apparatus provided in the multifunction machine.

As shown in FIG. 2, the image reading apparatus 5 has a clamshell-type open/close structure in which a cover portion 5b is attached to a flatbed portion 5a in an openable/closable manner.

A reading head 11, a first platen glass 13, a second platen glass 15, a white board 17, and the like are provided in the flatbed portion 5a, and a document feed tray 21, a document conveying apparatus 23, a document discharge tray 25, and the like are provided in the cover portion 5b.

The reading head 11, which is of a so-called CIS (Contact Image Sensor) type, includes an image sensor 31, an optical device 33 and a plurality of light sources 35. The image sensor 31 includes a plurality of light receiving units (line sensors in the first embodiment), and the optical device 33 includes a lens. In FIG. 2, only one of the light sources 35 is shown for simplification of the figure.

The reading head 11 is configured to irradiate lights from the plurality of light sources 35 to a document located at a reading target position and receive reflected lights from the document directly by the image sensor 31 through the optical device 33 to thereby read an image for one line in a main scanning direction by the image sensor 31.

Figure 3:
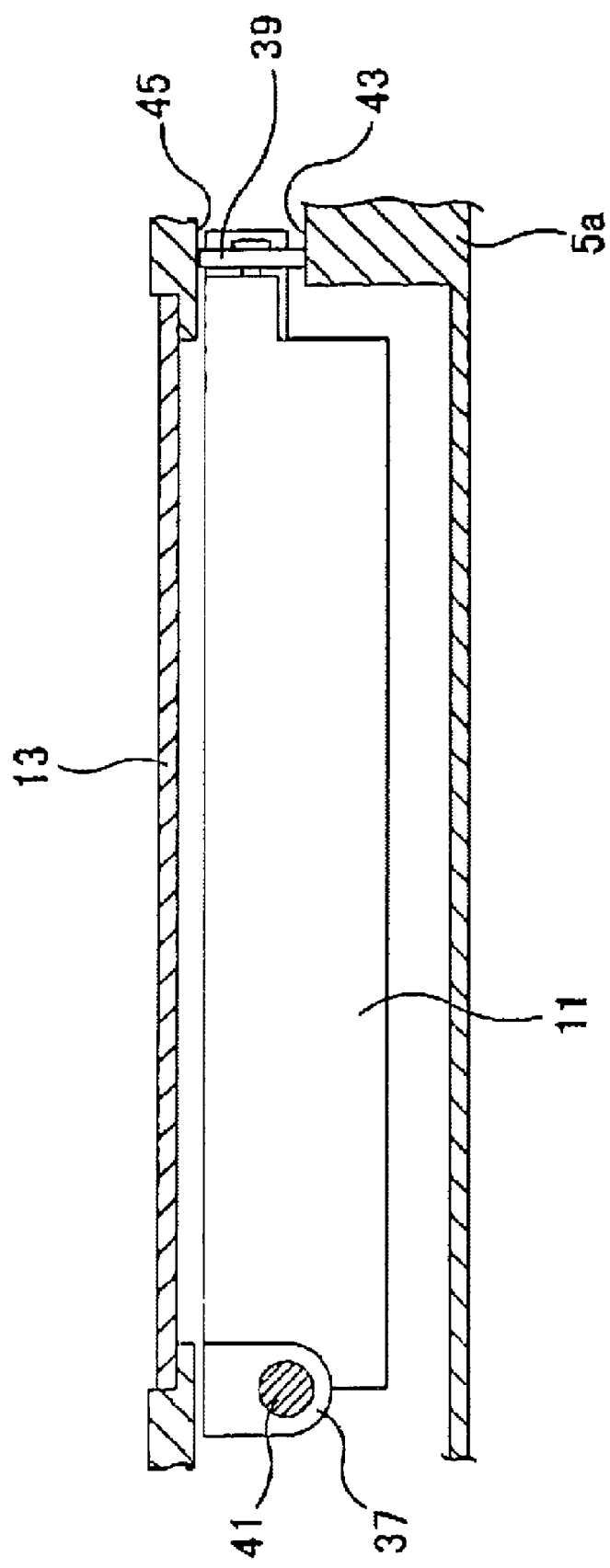
FIG. 3 is a cross-sectional view showing a reading head and a vicinity thereof seen from a direction of an arrow A in FIG. 2.

As shown in FIG. 3, the reading head 11 includes a bearing 37 at one end and a roller 39 at the other end. A guide bar 41 disposed in parallel with the first platen glass 13, the second platen glass 15 and the white board 17 in the flatbed portion 5a is inserted into the bearing 37, and the roller 39 is placed on a guide surface 43. Thus, the reading head 11 is placed between the guide bar 41 and the guide surface 43 in a bridging manner and reciprocates along the guide bar 41 in a sub scanning direction.

Returning to FIG. 2, a part of an upper end of the roller 39 projects above the reading head 11. A guide portion 45 is formed over the roller 39 so as to create a gap between the guide portion 45 and the roller 39. According to this configuration, if a force to rotate the reading head 11 around the guide bar 41 acts on the reading head 11 due to vibration, etc., caused during transportation of the multifunction machine 1, the roller 39 first abuts the guide portion 45. Accordingly, rotation of the reading head 11 is restricted, so that a main body of the reading head 11 is prevented from coming into collision with the first platen glass 13, the second platen glass 15, and the white board 17.

The first platen glass 13 is used to read an image from a document at an FB side. To read the image from the document using the FB, a user places the document on the first platen glass 13, presses the document against the first platen glass 13 with the cover portion 5b, and performs a predetermined operation on the operation panel 7 (for example, presses a reading start button). Then, in the image reading apparatus 5, a step motor 27 (see FIG. 4) for reading head movement is driven to move the reading head 11 along the guide bar 41 and thus the first platen glass 13 in the sub scanning direction, and the image is read from the document while the reading head 11 is moved.

The second platen glass 15 is used to read an image from a document at an ADF side. To read the image from the document using the ADF, the user sets the document on the document feed tray 21 and performs a predetermined operation on the operation panel 7 (for example, presses the reading start button). Then, in the image reading apparatus 5, the document conveying apparatus 23 is activated to convey the document from the document feed tray 21 to the document discharge tray 25, and the image is read from the document passing over an upper surface of the second platen glass 15 in the sub scanning direction with the reading head 11 kept stationary under the second platen glass 15.

The white board 17 is a member having a uniform density distribution of white. An image is read from the white board 17 and white level correction data required for converting actual measurement data into ideal data is acquired. Afterwards, a white level correction process (a shading correction process) is performed using the white level correction data.

As shown in FIG. 1, the image forming apparatus 3 incorporated in the lower main body 1a of the multifunction machine 1 introduces a sheet-type recording medium (for example, paper) from a paper feed tray 51 provided on a rear side of the multifunction machine 1. The image forming apparatus 3 forms an image on a recording surface of the recording medium, and discharges the recording medium with the image recorded thereon from a paper discharge port 53 provided on a front side of the multifunction machine 1. A pullout paper discharge tray 55 is contained in a lower portion of the paper discharge port 53. The paper discharge tray 55 is capable of being pulled out when required so as to receive the recording medium discharged from the paper discharge port 53.

The operation panel 7 is provided with a numeric keypad for inputting numeric values, a cursor key for selecting vertical and lateral directions, buttons and switches for input of various commands, a liquid crystal panel for displaying a menu screen and an error message, etc. This enables the user to specify an operation mode using these buttons and switches, select various menu items from the menu screen displayed on the liquid crystal panel to thereby set an operation mode, and make the liquid crystal panel display another menu screen.

<General Configuration of Control System>

Figure 4:
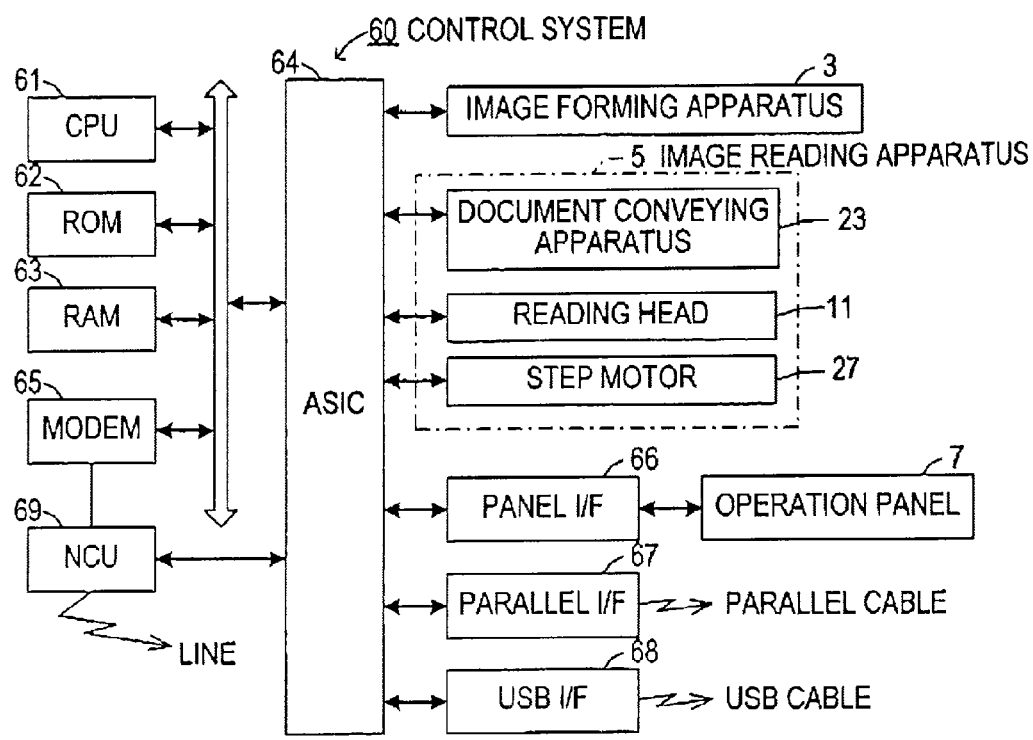
FIG. 4 is a block diagram showing a general configuration of a control system in the multifunction machine.

A shown in FIG. 4, the multifunction machine 1 includes a control system 60 constituted mainly by a microcomputer having a CPU 61, a ROM 62, a RAM 63, etc. The control system 60 also includes an ASIC (Application Specific Integrated Circuit) 64 and a modem 65, both of which are interconnected with the CPU 61, the ROM 62 and the RAM 63 through buses.

The ASIC 64 is also interconnected with the image forming apparatus 3, the image reading apparatus 5 (more particularly the above-mentioned document conveying apparatus 23, the reading head 11 and the step motor 27), a panel interface 66, a parallel interface 67, a USB interface 68 and a network control unit (NCU) 69.

The panel interface 66 is for inputting/outputting signals between the ASIC 64 and the operation panel 7. The parallel interface 67 is for inputting/outputting image information between the ASIC 64 and an external personal computer (PC) and the like. The USB interface 68 is for inputting/outputting image information between the ASIC 64 and an external device, such as a PC or a digital camera. The NCU 69 is for transmitting/receiving information between the ASIC 64 and an external facsimile apparatus through the public telephone lines.

The ASIC 64 controls the image forming apparatus 3, the image reading apparatus 5 and the NCU 69 in accordance with various control parameters set in registers inside the ASIC 64 to thereby make the multifunction machine 1 function as a printer, an image scanner, a copying machine (copying apparatus) and a facsimile apparatus.

The ASIC 64 also functions as a relay apparatus that provides input data from the interfaces 66 to 68 to the CPU 61, and provides input data from the CPU 61 to the operation panel 7 and the external device through the interfaces 66 to 68.

<Configuration of Image Sensor>

Figure 5:
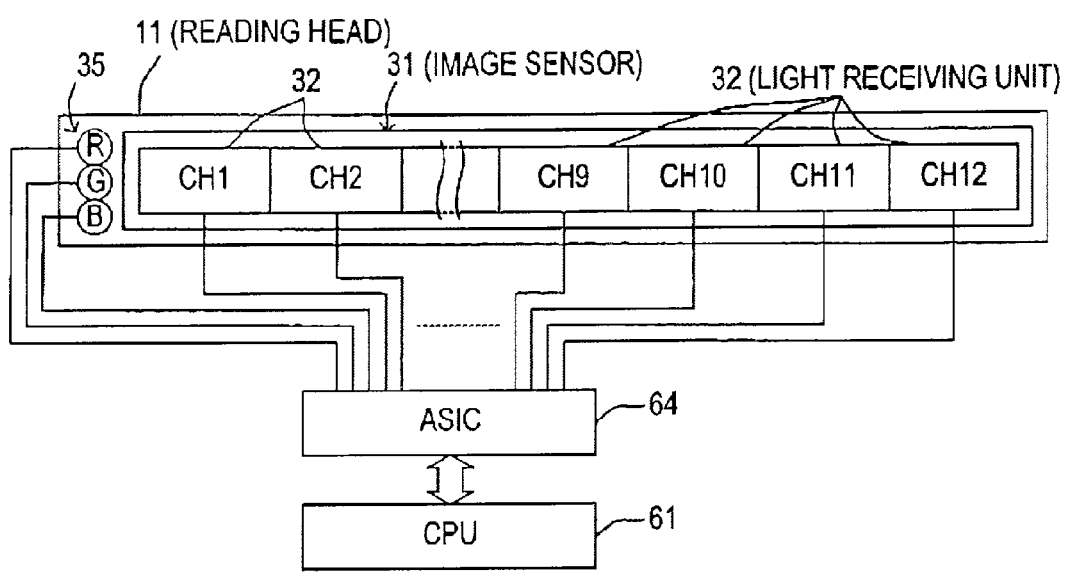
FIG. 5 is an explanatory view showing a configuration of an image sensor.

As shown in FIG. 5, the image sensor 31 includes twelve light receiving units 32 of CH1 to CH12 (CH represents "channel"). Each of the light receiving units 32 includes a line sensor having a plurality of photoelectric conversion devices aligned in a line. These light receiving units 32 are arranged in one line along the main scanning direction. More specifically, an entire reading area for one line in the main scanning direction in the image reading apparatus 5 is divided into twelve areas, and the light receiving units 32 are arranged, respectively, corresponding to the twelve areas.

When a reading start command is inputted from the ASIC 64, each of the light receiving units 32 latches light receiving signals from the plurality of photoelectric conversion devices constituting respective pixels. Subsequently, each of the light receiving units 32 outputs the latched light receiving signals sequentially in a predetermined order, in synchronization with a predetermined clock signal. Specifically, the light receiving signals are outputted in an order from the photoelectric conversion device at one end toward the photoelectric conversion device at the other end.

To enable the above operation, output signal lines for sequentially outputting the light receiving signals and input signal lines for inputting control signals from the ASIC 64 are pulled out from the light receiving units 32, respectively. These signal lines for the light receiving units 32 are collectively connected with a flexible flat cable (hereinafter referred to as the "FFC"), and then connected to a circuit board (not shown) on which the ASIC 64 is mounted.

The circuit board includes an analog front end (AFE) (not shown). The AFE latches output signals from the light receiving units 32 (light receiving signals from the respective pixels), sequentially A/D converts the latched output signals, and inputs the converted signals as pixel data to the ASIC 64 in a time-sharing manner. The ASIC 64 generates image data for one line in the main scanning direction from the pixel data sequentially inputted through the AFE.

The reading head 11 includes three light sources 35 of three colors, i.e., red (R), green (G) and blue (B), in order to read a color image from a document. Each of the light sources 35 may be provided with one light emitting device or may be provided with a plurality of light emitting devices.

In a case of reading a color image from a document, the ASIC 64 causes the light sources 35 to sequentially emit lights to thereby generate image data for one line in the main scanning direction for each of the colors. In a case of reading a monochrome image from a document, the ASIC 64 causes the light source 35 of green (G) to emit a light to thereby generate image data.

<Reading Determination Process>

Figure 6:
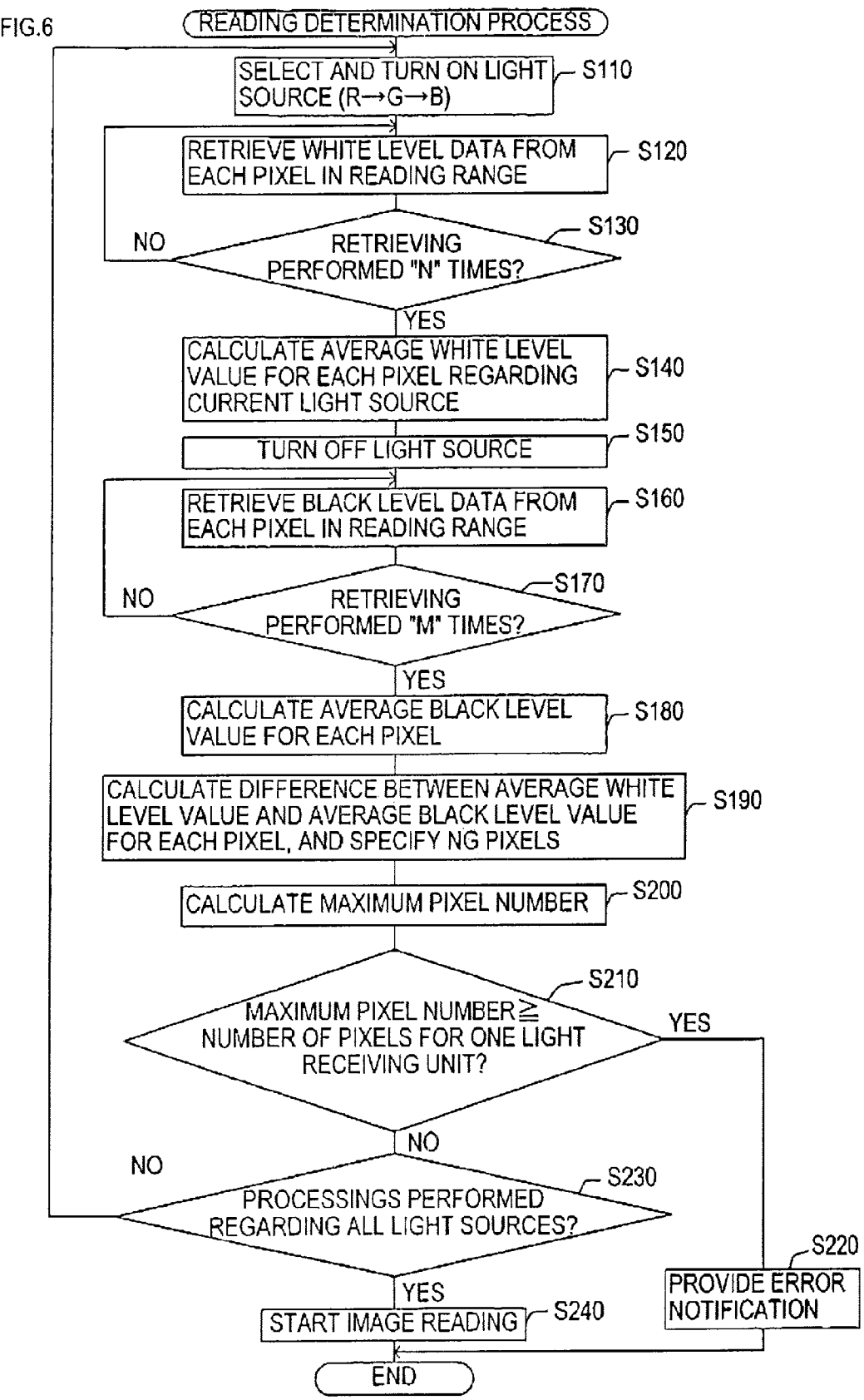
FIG. 6 is a flowchart showing a reading determination process performed by CPU.

The CPU 61 performs a reading determination process shown in FIG. 6 in order to determine whether or not a color image can be read in a normal manner through the reading head 11.

The reading determination process is performed by the CPU 61 before reading of a color image by the reading head 11 is started when a start command of facsimile transmission is inputted by a user through the operation panel 7. Before this process is performed, the reading head 11 needs to be moved to a position where the reading head 11 can read an image from the white board 17.

As shown in FIG. 6, when the reading determination process is started, one of the three light sources 35 of the three colors (for example, the light source 35 of red (R)) is selected and turned on in S110 (S indicates "Step").

In S120, pixel data is obtained from pixels of light receiving units 32 in a reading range set for the light source 35 turned on in S110, and is stored as a white level data for the light source 35 which is currently on.

A reading range of image data here is set using a reading area of one light receiving unit 32 as a minimum unit. In the first embodiment, an entire reading area for one line of image to be read by the image sensor 31 is divided into three areas (in other words, twelve light receiving units 32 are divided into three groups), and the divided three areas are assigned to the respective light sources 35.

More specifically, in the first embodiment, as exemplified in FIG. 7A, reading areas by the light receiving units 32 of CH1 to CH4 are set as a reading range when the light source 35 of red (R) is turned on. Reading areas by the light receiving units 32 of CH5 to CH8 are set as a reading range when the light source 35 of green (G) is turned on. Reading areas by the light receiving units 32 of CH9 to CH12 are set as a reading range when the light source 35 of blue (B) is turned on.

When pixel data (white level data) is retrieved in S120 from the pixels in the light receiving units 32 in the reading range corresponding to the light source 35 which is currently on, it is determined in S130 whether or not retrieval of white level data in S120 has been performed predetermined "n" times.

When it is determined that retrieval of white level data in S120 has not been performed the predetermined "n" times (S130: No), the process returns to S120, and retrieval of white level data is performed again.

When it is determined that retrieval of white level data in S120 has been performed the predetermined "n" times (S130: Yes), the process proceeds to S140.

In S140, an average value of the white level data (an average white level value) retrieved the predetermined "n" times in S120 is calculated for each of the pixels in the light receiving units 32 in the reading range. Then, the process proceeds to S150, and the light source 35 currently on is turned off.

In S160, pixel data is obtained from the pixels in the light receiving units 32 in the reading range where a current white level data is retrieved in S120, and is stored as a black level data.

In S170, it is determined whether or not retrieval of black level data in S150 has been performed predetermined "m" times.

When it is determined that retrieval of black level data has not been performed the predetermined "m" times (S170: No), the process returns to S160, and retrieval of black level data is performed again.

When it is determined that retrieval of black level data in S160 has been performed the predetermined "m" times (S170: Yes), the process proceeds to S180.

In S180, an average value of the black level data (an average black level value) retrieved the predetermined "m" times in S160 is calculated for each of the pixels in the light receiving units 32 in the reading range. Then, the process proceeds to S190.

In S190, a difference between the average white level value calculated in S140 and the average black level value calculated in S180 is calculated for each of the pixels in the light receiving units 32 in the above-mentioned reading range, and a pixel regarding which the calculated difference is equal to or less than a predetermined threshold is specified as an "NG pixel".

When image data is normally obtained from each of the pixels, the difference between the average white level value and the average black level value for each of the pixels will be larger, while when image data is not normally obtained from each of the pixels, the difference between the average white level value and the average black level value for each of the pixels will be little. Therefore, in S190, the difference between the average values is calculated and an abnormal pixel providing a difference equal to or less than the threshold is specified as an NG pixel.

Subsequently, in S200, a maximum number of continuous NG pixels (a maximum pixel number) in the reading range is calculated. In S210, it is determined whether or not the maximum pixel number calculated in S200 is equal to or more than a number of pixels for one light receiving unit 32.

When the maximum pixel number is less than the number of pixels for one light receiving unit 32, it can be assumed that there only is an obstacle, such as a dust, in a light path from the document to the light receiving unit 32 in the reading range, and that the light source 35 turned on in S110 and the image sensor 31 (more particularly the light receiving unit 32 in the reading range) is operating normally. Accordingly, in S210, it is determined whether or not image reading by the reading head 11 is possible by determining whether or not the maximum number of continuous NG pixels (the maximum pixel number) is equal to or more than the number of pixels for one light receiving unit 32.

When it is determined that the maximum pixel number is equal to or more than the number of pixels for one light receiving unit 32 (S210: Yes), image reading by the reading head 11 cannot be performed normally. Then, the process proceeds to S220, and an error notification is provided to the user.

The error notification in S220 is provided, for example, by displaying an error message on the liquid crystal panel provided in the operation panel 7 and generating a predetermined error notification sound from a speaker (not shown). After the error notification is provided in S220, a facsimile transmission process, in which image reading from a document and facsimile transmission is performed, is no longer performed, and the present reading determination process is terminated.

When it is determined in S210 that the maximum pixel number is not equal to or more than the number of pixels for one light receiving unit 32, and thus the light receiving unit 32 in the reading range is operating normally (S210: No), the process proceeds to S230.

In S230, it is determined whether or not the above described processings in S120 to S140 have been performed regarding all the light sources 35 of the three colors.

When it is determined that the processings in S120 to S140 have not been performed regarding all the light sources 35 (S230: No), the process returns to S110, and the light source 35) of green (G) or blue (B), which has not been turned on, is selectively turned on. Then, the sequential processings from S120 to S210 are performed again. In this case, it may be possible to omit the processings in S150 to S180 and use the average black level value which is calculated when the light source 35 of red (R) is on.

When it is determined in S230 that the processings in S120 to S210 have been performed regarding all the light sources 35 (S230: Yes), all the light receiving units 32 included in the image sensor 31 and all the light sources 35 are operating normally, and thus image reading by the reading head 11 can be performed normally.

Accordingly, the process proceeds to S240, and an image reading process for facsimile transmission is started and the present reading determination process is terminated.

<Advantages of First Embodiment>

In the image reading apparatus 5 of the first embodiment, as described above, the image sensor 31 includes the plurality of light receiving units 32. Accordingly, it may be automatically determined through the reading determination process by the CPU 61, in a case of reading a color image from a document at the time of facsimile transmission, whether or not reading of the color image can be normally performed by the reading head 11.

In the first embodiment, each reading range (in other words, the light receiving units 32 from which image data is to be retrieved) for retrieving image data by the image sensor 31 is predetermined for each of the lights of the respective colors (R, G and B) irradiated from the plurality of light sources 35, in order to perform the reading determination process.

Since the reading ranges are formed by dividing the entire reading area to be read by the image sensor 31 into three areas, the divided areas correspond to the three respective light sources 35.

Accordingly, the number of pixels to be used for color image reading determination in one reading determination process is the number of pixels for one line of the image sensor 31 in the first embodiment. Thus, a processing load in the reading determination process may be reduced and a processing time may be shortened, compared with a case of retrieving image data from all the pixels in the image sensor 31 for each of the lights of colors (R, G and B) irradiated from the light sources 35 (in this case, the number of pixels corresponds to a number of pixels for three lines).

MODIFIED EXAMPLE 1

The first embodiment has been described as an apparatus, in which each time the processings (S110 to S140) of turning on one of the light sources 35 for the three colors and calculating an average white level value for each of the pixels in the light receiving units 32 in the reading range corresponding to the color of the light source 35, and calculating an average black level for each of the pixels (S150 to S180). Then, it is determined whether or not the light source 35 and the light receiving units 32 in the reading range corresponding to the light source 35 are operating normally (S190 to S210).

Figure 8:
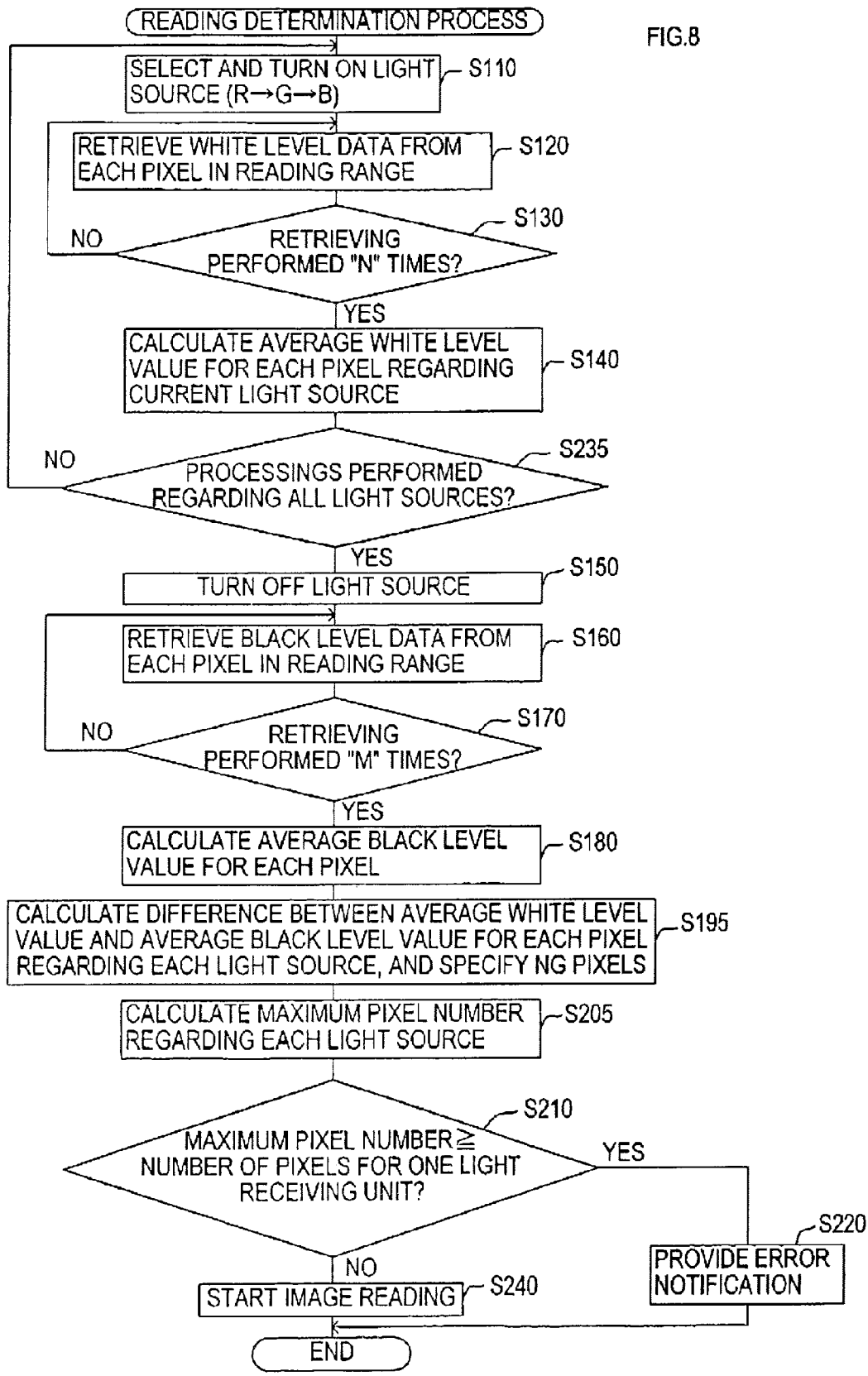
FIG. 8 is a flowchart showing a modified example of the reading determination process in FIG. 6.

However, the reading determination process may be configured as follows: As shown in FIG. 8, after the sequential processings from S110 to S140 are performed, it is determined in S235 whether or not the sequential processings have been performed regarding all the light sources 35 of the three colors. When it is determined that the sequential processings have not yet been performed regarding all the light sources 35 (S235: No), the process returns to S110 and the light source 35 of green (G) or blue (B), which has not yet been turned on, is turned on so that average white level values for all the light sources 35 are calculated. Subsequently, average black level values are calculated (S150 to S180).

In this case, after the average black level values are calculated in S180, each difference between each of the average white level values and each of the corresponding average black level values for each pixel for each of the light sources 35 is calculated, and thus NG pixels are specified based on the differences. A maximum pixel number is calculated for each of the light sources 35 in S205, and it is determined in S210 whether or not any one of the calculated maximum pixel numbers is equal to or more than the number of pixels for one light receiving unit 32.

Also in the reading determination process configured as in this example, it may be possible to determine whether or not the image sensor 31 and all the light sources 35 in the reading head 11 are operating normally and thus color image reading can be performed normally.

MODIFIED EXAMPLE 2

In the first embodiment, each of the reading ranges is formed by a plurality of adjacent light receiving units 32, as shown in FIG. 7A. However, each of the reading ranges may be formed, for example, by a plurality of separately located light receiving units 32, as shown in FIG. 7B.

Specifically, the reading range shown in FIG. 7B is set such that image data is retrieved from the light receiving units 32 of CH1, CH4, CH7 and CH10 when the light source 35 of red (R) is on, from the light receiving units 32 of CH2, CH5, CH8 and CH11 when the light source 35 of green (G) is on, and from the light receiving units 32 of CH3, CH6, CH9 and CH12 when the light source 35 of blue (B) is on. According to this configuration, color image reading determination by the reading head 11 may be performed in a same manner as in the first embodiment.

In the first embodiment, it is described that the reading ranges are set so as not to overlap each other.

In this case, it may be determined whether or not color image reading can be normally performed through the reading head 11. However, when all the pixels in a reading range are specified as NG pixels, it is impossible to determine which of the light receiving units 32 and the light source 35 a cause of abnormality is in and to notify the user of a determination result.

To enable specifying the cause of abnormality, the reading ranges may be set so as to partially overlap each other. Then, it may be determined whether or not abnormality occurs in image data in the overlapped reading ranges, and thus whether or not the cause of abnormality is in the light sources 35.

A description will be provided below on reading determination processes that enable specifying a cause of abnormality as second to fourth embodiments of the present invention. Each of these embodiments has a same apparatus configuration as in the first embodiment, and only has a different reading determination process performed by the CPU 61.

Second Embodiment

Figure 9:
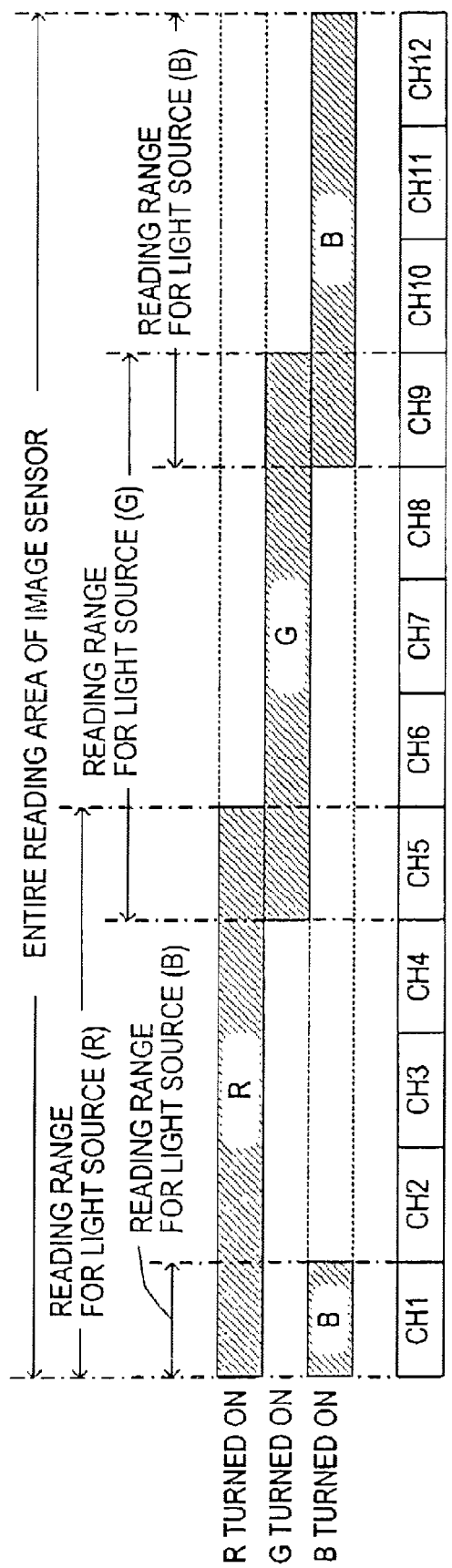
FIG. 9 is an explanatory view showing an image data retrieving procedure in a second embodiment.

In a second embodiment, as shown in FIG. 9, the retrieving procedure of image data is configured such that image data is retrieved from the light receiving units 32 of CH1 to CH5 when the light source 35 of red (R) is on, from the light receiving units 32 of CH5 to CH9 when the light source 35 of green (G) is on, and from the light receiving units 32 of CH9 to CH12 and CH1 when the light source 35 of blue (B) is on.

Figure 10A:
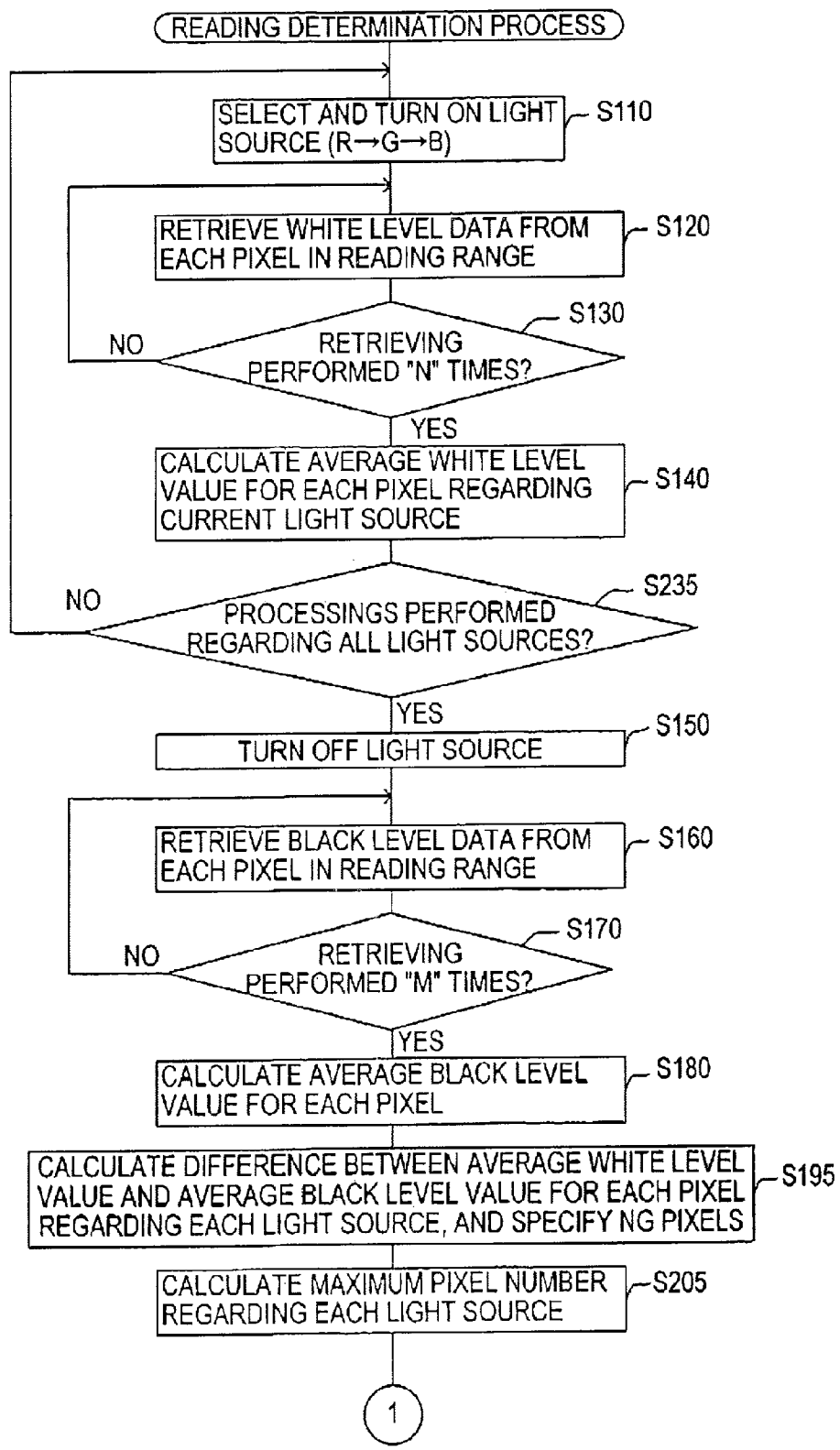
FIG. 10A is a flowchart showing a part of a reading determination process in the second embodiment.
Figure 10B:
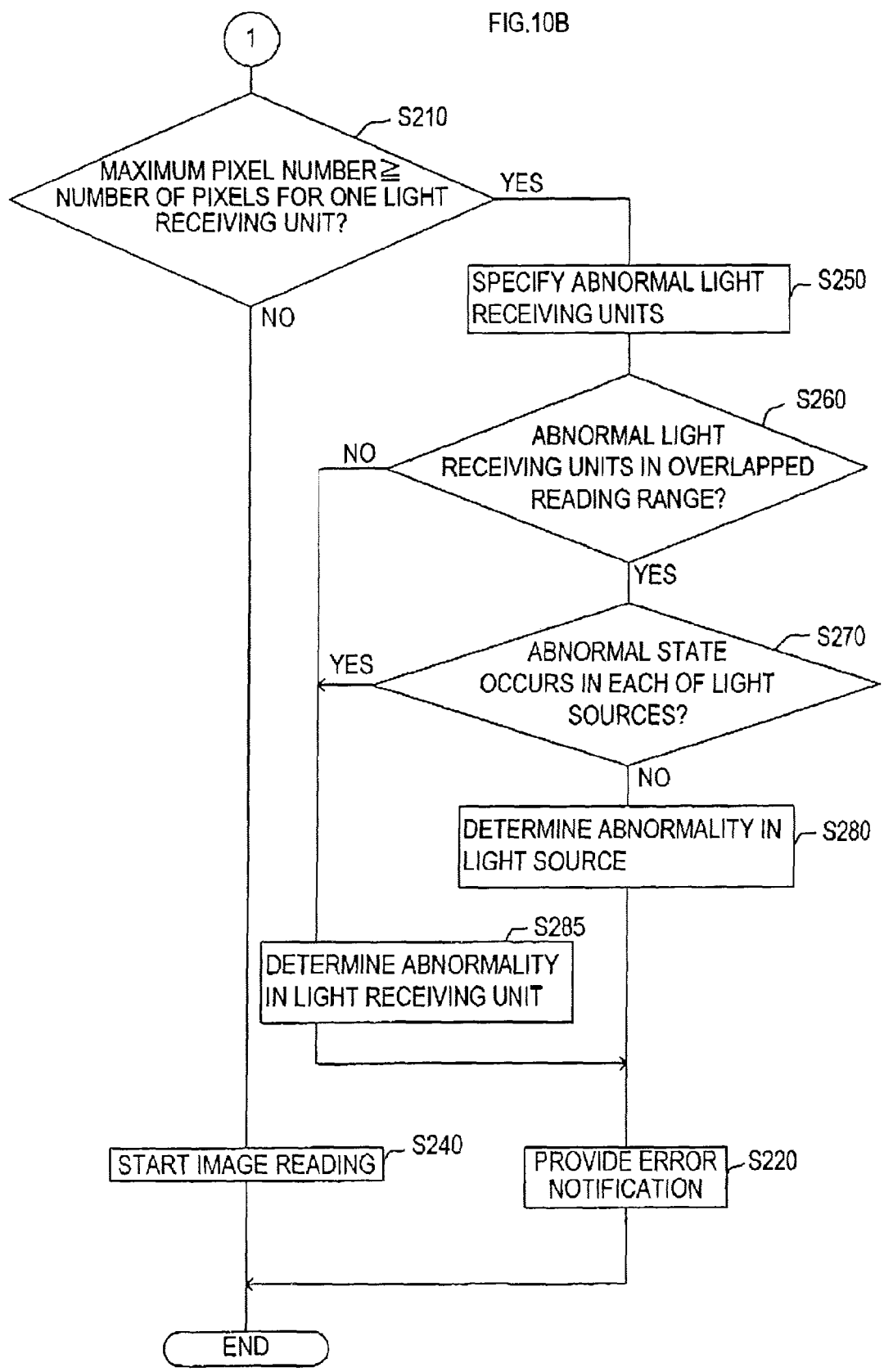
FIG. 10B is a flowchart showing the remaining part of the reading determination process in the second embodiment.

In the reading determination process, as shown in FIG. 10A and FIG. 10B, the light sources 35 of the respective colors (R, G and B) are sequentially turned on in a same manner as in the reading determination process shown in FIG. 8. Image data is retrieved from the light receiving units 32 in the respective reading ranges, average white level values for the respective pixels are calculated (S110 to S140), and then average black level values for the respective pixels are calculated (S150 to S180).

NG pixels regarding each of the light sources 35 are specified in S195, a maximum pixel number is calculated for each of the light sources 35 in S205, and it is determined in S210 whether or not there is abnormality in the reading head 11 based on the maximum pixel number. When it is determined that there is no abnormality in the reading head 11 (S210: No), the process proceeds to S240, and image reading is started.

When it is determined that there is an abnormality in the reading head 11 (S210: Yes), the process proceeds to S250, and abnormal light receiving units 32 including continuous NG pixels are specified for each of the light sources 35 based on the NG pixels specified in S195. Then, the process proceeds to S260.

In S260, it is determined whether or not the specified abnormal light receiving units 32 include the light receiving units 32 of CH1, CH5 or CH9 which is the overlapped reading range.

When the abnormal light receiving units 32 do not include the light receiving units 32 of CH1, CH5 or CH9 (S260: No), it is determined that the abnormal light receiving units 32 themselves are abnormal (S285), and the process proceeds to S220. Then, the abnormal light receiving units 32 are notified to the user, and the process is terminated.

When the abnormal light receiving units 32 include the light receiving units 32 of CH1, CH5 or CH9 (S260: Yes), the process proceeds to S270. In S270, it is determined whether each of the abnormal light receiving units 32 of CH1, CH5 or CH9 presents an abnormal state, in which NG pixels are continuously located when each of the light sources 35 is turned on, or only when one of the light sources 35 is turned on.

When it is determined that the abnormal state occurs when each of the light sources 35 is turned on (S270: Yes), the abnormal light receiving unit 32 itself is considered abnormal (S285) since there is a low possibility of both of the light sources 35 becoming abnormal at the same time. The process proceeds to S220, and the abnormal light receiving units 32 are notified to the user. Then, the process is terminated.

When it is determined that the abnormal state occurs only when one of the light sources 35 is turned on (S270: No), it is determined that there is an abnormality in the light source 35 which is on during the abnormal state (S280). The process proceeds to S220, and the abnormality in the light source 35 is notified to the user. Then, the process is terminated.

In the second embodiment, as described above, the reading ranges for the light sources 35 of respective colors (R, G and B) when image data is retrieved from the image sensor 31 are partially overlapped (i.e., the light receiving units 32 of CH1, CH5 and CH9).

Thus, according to the second embodiment, it may be possible not only to notify the user of an abnormality in image reading by the reading head 11 but also to specify whether the abnormality is due to the light sources 35 or the image sensor 31 and notify the user of the same.

Third Embodiment

In a third embodiment, as shown in FIG. 11A, the retrieving procedure of image data is configured such that image data is retrieved from all the light receiving units 32 of CH1 to CH12 when the light source 35 of red (R) is on, and from a light receiving unit 32 (the light receiving unit 32 of CH4 in FIG. 11A), from which image data has been normally retrieved when the light source 35 of red (R) is on, when the light source 35 of green (G) or blue (B) is on.

Also, as shown in FIG. 11B, the retrieving procedure is configured such that, if image data has not been normally retrieved from any of the light receiving units 32 when the light source 35 of red (R) is on, image data is retrieved from a given light receiving unit 32 (the light receiving unit 32 of CH4 in FIG. 11B) when the light source 35 of green (G) or blue (B) is on.

Figure 12A:
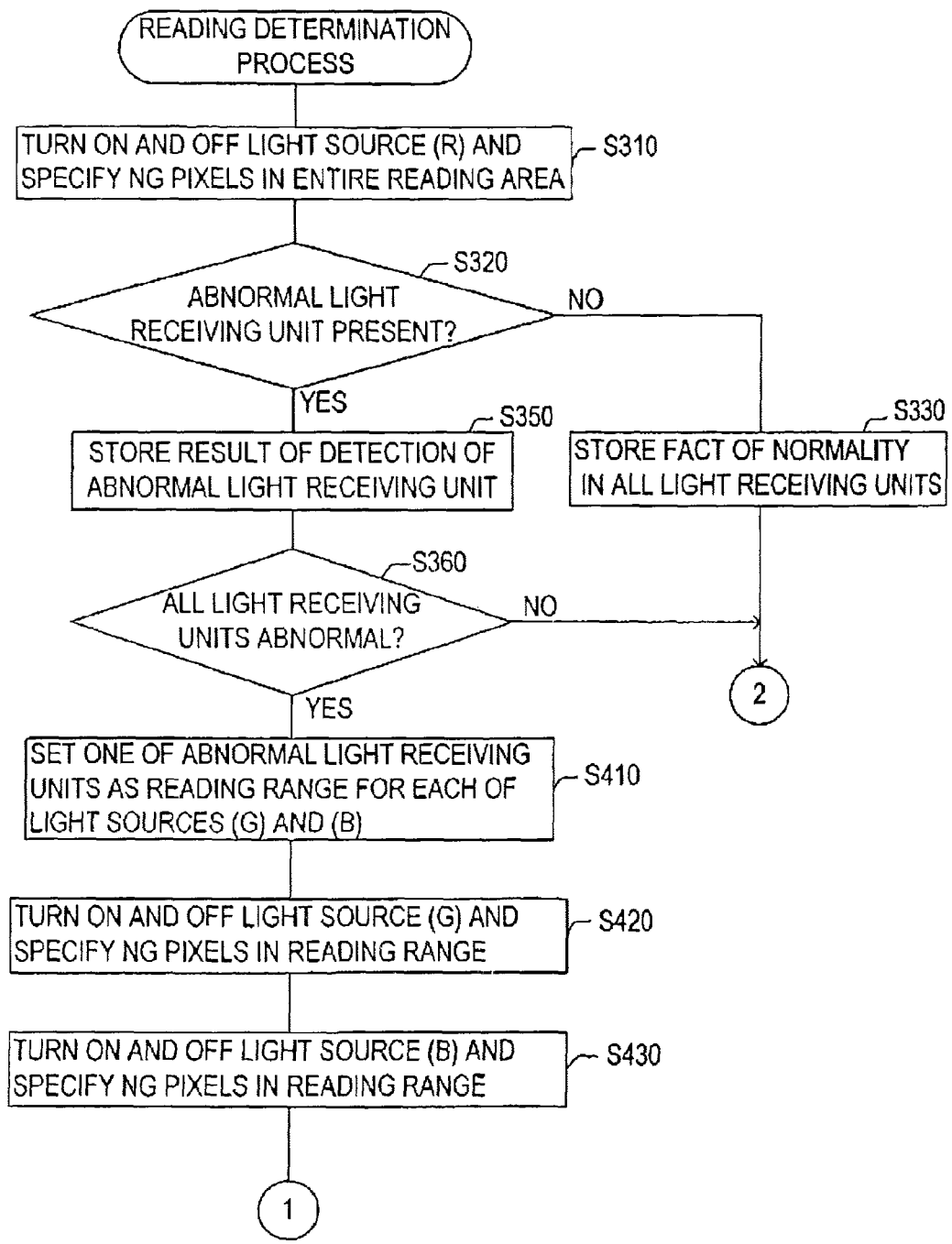
FIG. 12A is a flowchart showing a part of a reading determination process in the third embodiment.
Figure 12B:
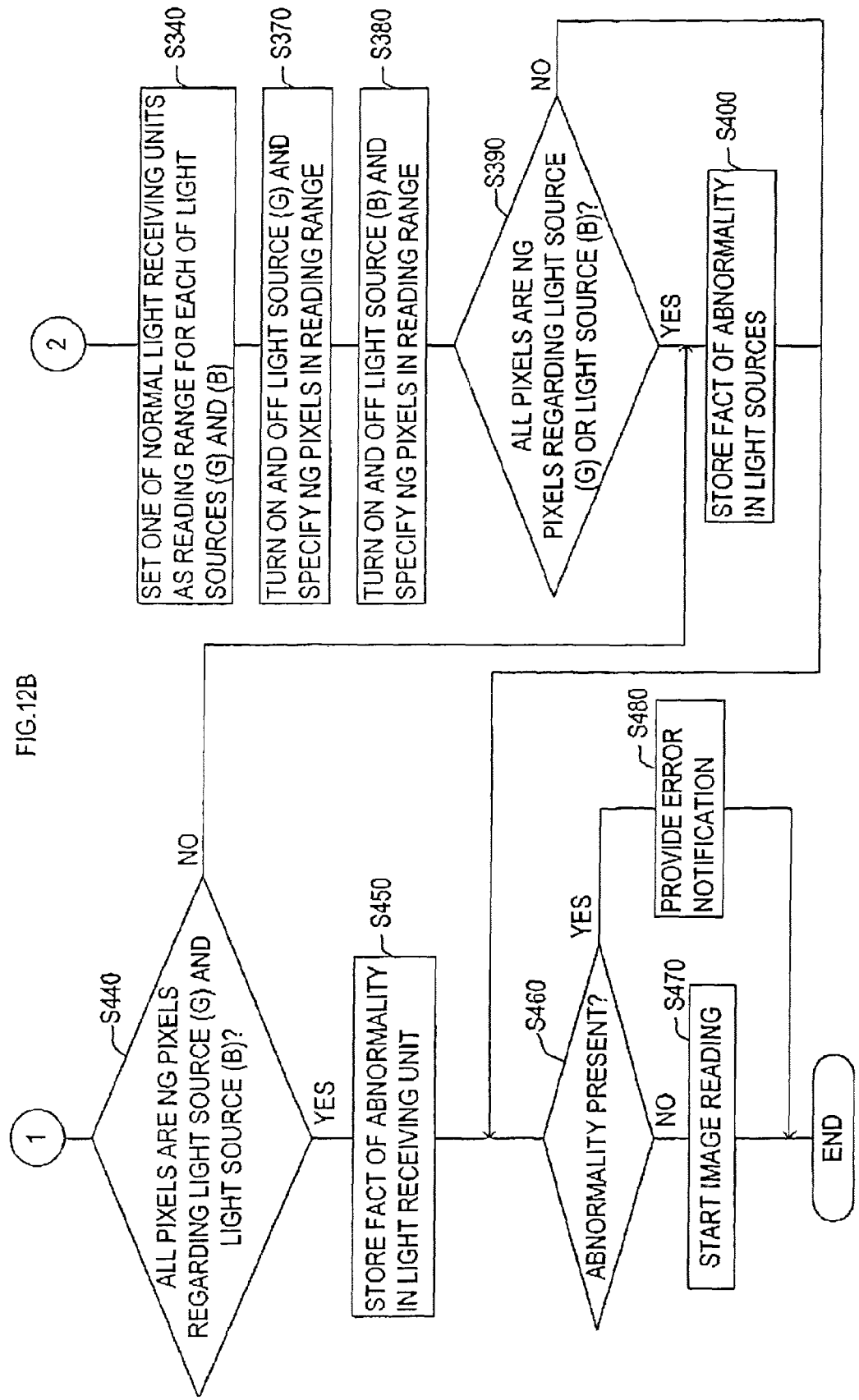
FIG. 12B is a flowchart showing the remaining part of the reading determination process in the third embodiment.

The reading determination process in the third embodiment is as shown in FIG. 12A and FIG. 12B. In S310, the light source 35 of red (R) is turned on and turned off, image data is retrieved from all the light receiving units 32, and average white level values and average black level values for all the pixels are calculated, to thereby specify NG pixels in a same manner as in the processings in S110 to S190 shown in FIG. 6.

In S320, it is determined whether there is an abnormal light receiving unit in a same manner as in the processings in S200 and S210 shown in FIG. 6. When it is determined that there is no abnormal light receiving unit (S320: No), the fact that all the light receiving units 32 are normal is stored in S330, and the process proceeds to S340.

When it is determined in S320 that there is an abnormal light receiving unit (S320: Yes), the process proceeds to S350. In 350, all abnormal light receiving units having continuous NG pixels are detected and a detection result is stored.

In S360, it is determined whether or not all the light receiving units 32 constituting the image sensor 31 are abnormal. When it is determined that all the light receiving units 32 are abnormal (S360: Yes), the process proceeds to S410. When it is determined that not all the light receiving units 32 are abnormal (S360: No), the process proceeds to S340.

In S340, one normal light receiving unit 32 (the light receiving unit 32 of CH4 in FIG. 11A) is set as a reading range for each of the light sources 35 of green (G) and blue (B).

In S370, the light source 35 of green (G) is turned on and turned off, image data is retrieved from the one light receiving unit 32 set as the reading range in S340, and an average white level value and an average black level value for each of the pixels in the light receiving unit 32 are calculated, to thereby specify NG pixels. The process then proceeds to S380.

In S380, the light source 35 of blue (B) is turned on and turned off, image data is retrieved from the one light receiving unit 32 set as the reading range in S340, and an average white level value and an average black level value for each of the pixels in the light receiving unit 32 are calculated, to thereby specify NG pixels. The process then proceeds to S390.

In S390, it is determined whether or not the NG pixels specified by turning on the light source 35 of green (G) or blue (B) correspond to all the pixels in the light receiving unit 32 set as the reading range.

If it is determined that all the pixels in the light receiving unit 32 set as the reading range are NG pixels when the light source 35 of green (G) or blue (B) is turned on (S390: Yes), the light source 35 is considered abnormal, and the process proceeds to S400. In S400, the fact of abnormality in the light source 35 is stored, and then the process proceeds to S460.

If it is determined that not all the pixels in the light receiving unit 32 set as the reading range are NG pixels when the light source 35 of green (G) or blue (B) is turned on (S390: Yes), the process directly proceeds to S460.

In S410, one abnormal light receiving unit 32 (the light receiving unit 32 of CH4 in FIG. 11B) is set as a reading range for each of the light sources 35 of green (G) and blue (B).

In S420, the light source 35 of green (G) is turned on and turned off, image data is retrieved from the light receiving unit 32 set as the reading range in S410, and an average white level value and an average black level value for each of the pixels in the light receiving unit 32 are calculated, to thereby specify NG pixels. The process then proceeds to S430.

In S430, the light source 35 of blue (B) is turned on and turned off, image data is retrieved from the light receiving unit 32 set as the reading range in S410, and an average white level value and an average black level value for each of the pixels in the light receiving unit 32 are calculated, to thereby specify NG pixels. The process then proceeds to S440.

In S440, it is determined whether or not the NG pixels specified by turning on each of the light sources 35 of green (G) and blue (B) correspond to all the pixels in the one light receiving unit 32 set as the reading range for each of the light sources 35 of green (G) and blue (B).

When it is determined that not all the pixels in the light receiving unit 32 are NG pixels both of when the light source 35 of green (G) is turned on and when the light source 35 of blue (B) is turned on, i.e., in a case where image data is retrieved normally at least one of when the light source 35 of green (G) is turned on and when the light source 35 of blue (B) is turned on (S440: No), the process proceeds to S400.

When it is determined that all the pixels in the light receiving unit 32 are NG pixels when each of the light sources 35 of green (G) and blue (B) is turned on, i.e., in a case where all the pixels are NG pixels regarding both of the light sources 35 of green (G) and blue (B), (S440: Yes), the process proceeds to S450.

In S450, the light receiving unit 32 (in other words, the image sensor 31) is considered abnormal since both of the light sources 35 are less likely to be abnormal at the same time, and the fact is stored. The process then proceeds to S460.

In S460, it is determined whether or not abnormality in color image reading by the reading head 11 is determined through the sequential processings from S310 to S450.

When abnormality in the reading head 11 is not determined (S460: No), image reading is started in S470, and then the process is terminated. When abnormality in the reading head 11 is determined (S460: Yes), an error notification is provided to the user in S480, and then the process is terminated.

Since an abnormality in the light receiving unit 32, an abnormality in the entire image sensor 31 or an abnormality in the light source 35 is independently determined through the sequential processings from S310 to S450, not only an abnormality in image reading by the reading head 11 but also where the abnormality is may be notified to the user in S480.

Thus, according to the third embodiment, the user may be notified of not only an abnormality in image reading by the reading head 11 but also where the abnormality is, and therefore may easily perform repair work (such as replacement of a part) on the image reading apparatus 5.

Fourth Embodiment

Figure 13:
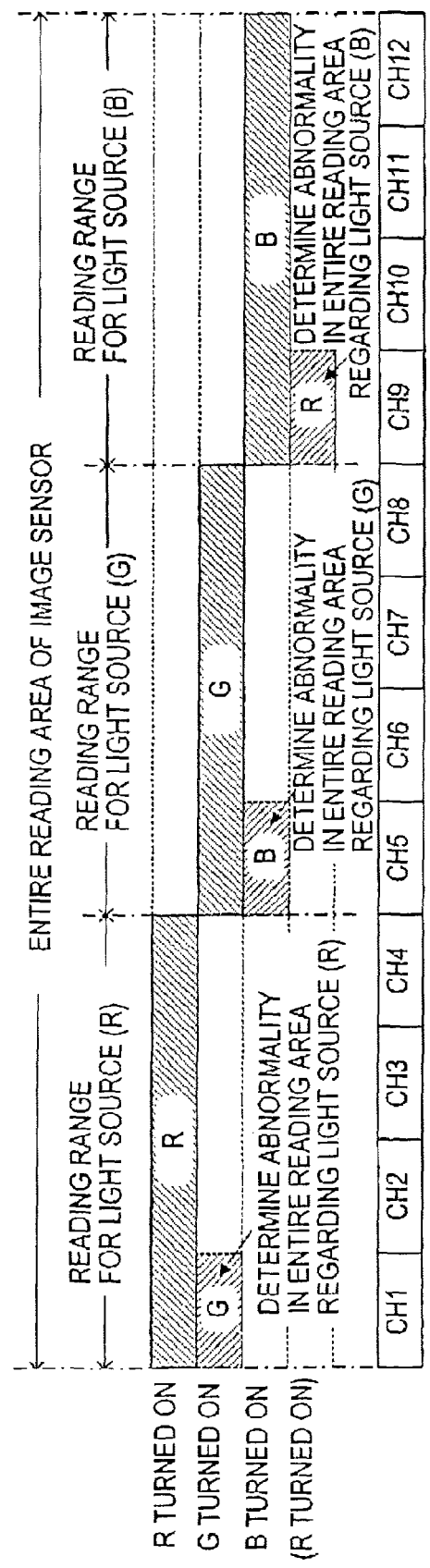
FIG. 13 is an explanatory view showing an image data retrieving procedure in a fourth embodiment.

In a fourth embodiment, as shown in FIG. 13, the retrieving procedure of image data is configured in a same manner as in the retrieving procedure in the first embodiment shown in FIG. 7A.

In the reading determination process, determination of abnormality in retrieving of image data is performed regarding each of the light sources 35 of the respective colors (R, G and B). When it is determined that all the light receiving units 32 set as the reading range of image data, image data is retrieved also from one of the light receiving units 32 in the reading range when the next light source 35 is turned on. Then, it is determined which of the light sources 35 and the light receiving units 32 the cause of the abnormality is in based on the retrieved image data.

Figure 14:
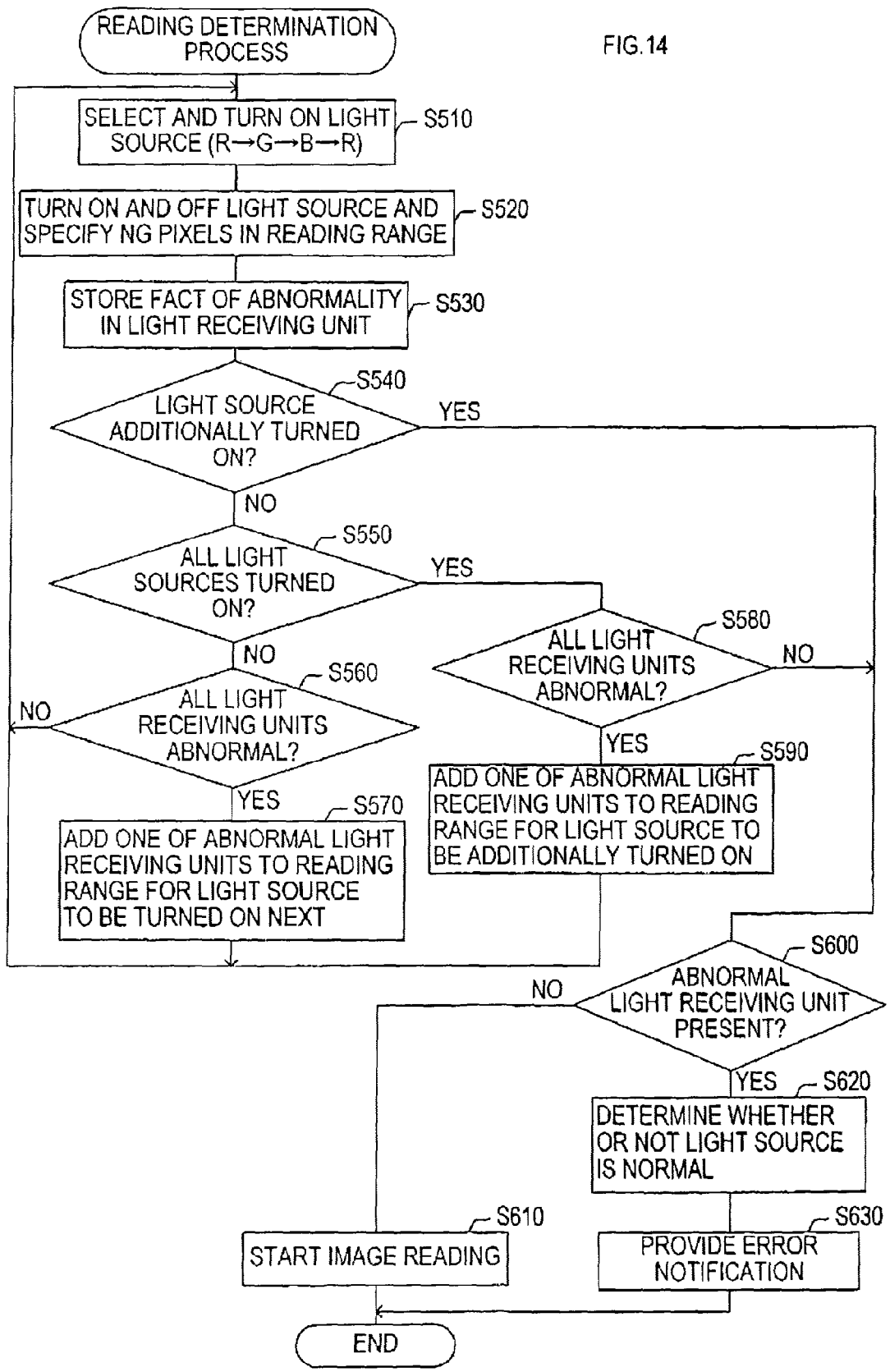
FIG. 14 is a flowchart showing a reading determination process in the fourth embodiment.

Specifically, in the reading determination process of the fourth embodiment, as shown in FIG. 14, one of the light sources 35 of the three colors (for example, the light source 35 of red (R)) is first selected in S510. The processing in S510 is configured such that, each time the processing is performed, the light source 35 is selected in an order of red (R), green (G), blue (B) and again red (R).

In S520, the light source 35 selected in S510 is turned on and turned off, image data is retrieved from all of the light receiving units 32 in the reading range, and an average white level value and an average black level value for each of the pixels in the reading range are calculated, to thereby specify NG pixels in a same manner as in the processings from S120 to S190 shown in FIG. 6.

In S530, all abnormal light receiving units, in which all pixels are NG pixels, are detected from the light receiving units 32 in the reading range and a detection result is stored.

In S540, it is determined whether or not the light source 35 of red (R) is currently additionally turned on (at an aftermentioned time of additional turn-on) after the light sources 35 of the three colors (R, G and B) are turned on. When it is determined that the light source 35 is currently additionally turned on (S540: Yes), the process proceeds to S600. When it is determined that the light source 35 is not currently additionally turned on (S540: No), the process proceeds to S550.

In S550, it is determined whether or not a last light source 35 of all the light sources 35 of the three colors (R. G and B) has been turned on (i.e., all the light sources 35 have been turned on). When it is determined that all the light sources 35 have been turned on (S550: Yes), the process proceeds to S580. When it is determined that all the light sources 35 have not been turned on (S550: No), the process proceeds to S560.

In S560, it is determined whether or not all the light receiving units 32 in the reading range set for the light source 35, which is currently turned on, are detected as abnormal light receiving units through the sequential processings from S610 to S530.

When it is determined that all the light receiving units 32 in the reading range are detected as abnormal light receiving units (S560: Yes), the process proceeds to S570. In S570, one of the abnormal light receiving units is added to the reading range set for the light source 35 to be turned on next, and then the process returns to S510.

When it is determined that not all the light receiving units 32 in the reading range are detected as abnormal light receiving units (S560: No), the process directly returns to S510.

In 580, it is determined in a same manner as in S560, whether or not all the light receiving units 32 in the reading range set for the light source 35, which is currently turned on, are detected as abnormal light receiving units through the sequential processings from S510 to S530.

When it is determined that all the light receiving units 32 in the reading range arc detected as abnormal light receiving units (S580: Yes), the process proceeds to S590. In S590, one of the abnormal light receiving units is added to the reading range for the light source 35 of red (R) to be additionally turned on next, and then the process returns to S510.

When it is determined that not all the light receiving units 32 in the reading range are detected as abnormal light receiving units (S580: No), the process proceeds to S600.

In S600, it is determined whether or not there is a light receiving unit 32 detected as an abnormal light receiving unit through the sequential processings from S510 to S590. When it is determined that there is no abnormal light receiving unit (S600: No), image reading is started in S610, and then the process is terminated. When it is determined that there is an abnormal light receiving unit (S600: Yes), the process proceeds to S620.

In S620, it is determined whether or not the abnormal light receiving unit added to the reading range in S570 or S590 is detected as an abnormal light receiving unit also regarding the light source 35 of the color having the reading range including the added abnormal light receiving unit, so that it is determined whether or not the light source 35 of the color having the reading range initially including the abnormal light receiving unit is operating normally.

In S630, an error notification is performed by providing an error message notifying of the light receiving unit 32 detected as an abnormal light receiving unit in S530 and of the light source 35 of the color determined abnormal in S620. Then, the reading determination process is terminated.

Thus, according to the fourth embodiment, the user may be notified of not only an abnormality in image reading by the reading head 11 but also where the abnormality is, and therefore may easily perform repair work (such as replacement of a part) on the image reading apparatus 5.

Also, according to the fourth embodiment, no area is added to the reading range of image data initially set in a same manner as in the first embodiment, as long as image reading by the reading head 11 is normally performed. Thus, it may be possible to perform the reading determination process in a short time and start image reading for facsimile transmission.

Other Embodiments

Although embodiments of the present invention have been described as above, the present invention should not be limited to the above described embodiments, but may be embodied in various forms without departing from the spirit and scope of the present invention.

For example, the image sensor 31 is constituted by twelve light receiving units 32 in the descriptions of the above embodiments. However, the present invention may be applied in a same manner as in the above embodiments and provide the same advantage, as long as the image sensor 31 is constituted by a plurality of light receiving units, regardless of whether the number of the light receiving units is an even number or an odd number.

While the image reading apparatus 5 provided with an FB and an ADF is illustrated by an example in the above embodiments, an image reading apparatus provided with one of an FB and an ADF may adopt the configuration of the present invention.

While the reading head 11 is illustrated as a reading head of a GIS-type in the above embodiments, the present invention may be applied to a reading head of a CCD-type, including an optical system with a mirror, in a same manner as in the above embodiments, to thereby achieve the same advantage.

While the image sensor 31 includes twelve light receiving units 32 in the above embodiments, the number of light receiving units in the present invention is not limited to twelve, but may be two or more to eleven or less, or may be thirteen or more.

What is claimed is:

1. An image reading apparatus comprising:
a plurality of light emitting units each emitting a light to irradiate a reading target with the light;
an activation unit that sequentially activates the plurality of light emitting units, respectively, in accordance with a predetermined order;
a plurality of light receiving units each outputting an output signal when receiving a reflected light from the reading target; and
a determination unit that retrieves at least one output signal from the plurality of light receiving units in accordance with a predetermined retrieving procedure each time each of the plurality of light emitting units is activated sequentially, the predetermined retrieving procedure being configured such that at least one output signal is retrieved from a part of the plurality of light receiving units in response to an activation of each of the plurality of light emitting units, and determines, based on the at least one output signal, whether or not at least one of at least one of the plurality of light emitting units and at least one of the plurality of light receiving units is normal.

2. An image reading apparatus comprising:
a plurality of light emitting units each emitting a light to irradiate a reading target with the light;
an activation unit that activates the plurality of light emitting units, respectively, in accordance with a predetermined order;
a plurality of light receiving units each outputting an output signal when receiving a reflected light from the reading target; and
a determination unit that retrieves at least one output signal from the plurality of light receiving units in accordance with a predetermined retrieving procedure each time each of the plurality of light emitting units is activated, the predetermined retrieving procedure being configured such that at least one output signal is retrieved from a part of the plurality of light receiving units in response to an activation of at least one of the plurality of light emitting units, and determines, based on the at least one output signal, whether or not at least one of at least one of the plurality of light emitting units and at least one of the plurality of light receiving units is normal,
wherein the retrieving procedure is configured, such that whether or not to retrieve at least one output signal from at least one of the plurality of light receiving units is changed in response to an activation of each of the plurality of light emitting units.

3. The image reading apparatus according to claim 2, wherein the retrieving procedure is further configured such that at least one output signal outputted from the plurality of light receiving units is retrieved in response to an activation of each of the plurality of light emitting units.

4. The image reading apparatus according to claim 3, wherein the retrieving procedure is further configured such that each of output signals outputted from the plurality of light receiving units is retrieved in response to an activation of at least one of the plurality of light emitting units.

5. The image reading apparatus according to claim 4, wherein the retrieving procedure is configured such that whether or not to retrieve each of the output signals outputted from the plurality of light receiving units is changed.

6. The image reading apparatus according to claim 4, wherein the retrieving procedure is configured such that at least one of the output signals outputted from the plurality of light receiving units is retrieved in response to an activation of one of the plurality of light emitting units.

7. The image reading apparatus according to claim 4, wherein the retrieving procedure is configured such that at least one of the output signals outputted from the plurality of light receiving units is retrieved in response to activations of at least two of the plurality of light emitting units.

8. The image reading apparatus according to claim 4, wherein the retrieving procedure is configured such that each of the output signals outputted from the plurality of light receiving units is retrieved once by the time all activations of the plurality of light emitting units are completed.

9. The image reading apparatus according to claim 8, wherein the determination unit is configured such that, when determining that at least one output signal retrieved in accordance with the retrieving procedure is abnormal, the determination unit retrieves at least one output signal from at least one light receiving unit, an output signal from which is determined abnormal, among the plurality of light receiving units, also when another one of the plurality of light emitting units is activated.

10. The image reading apparatus according to claim 2, wherein the plurality of light receiving units are arranged in a predetermined line.

11. The image reading apparatus according to claim 10, wherein the plurality of light receiving units are at least three light receiving units, and wherein the retrieving procedure is configured such that output signals are retrieved from at least two light receiving units arranged to be adjacent to each other among the plurality of light receiving units in response to an activation of at least one of the plurality of light emitting units.

12. The image reading apparatus according to claim 10, wherein the plurality of light receiving units include at least three light receiving units, and wherein the retrieving procedure is configured such that output signals are retrieved from at least two light receiving units, with at least one light receiving unit arranged therebetween, among the plurality of light receiving units in response to an activation of at least one of the plurality of light emitting units.

13. The image reading apparatus according to claim 2, wherein the retrieving procedure is configured such that, when at least one of the plurality of light emitting units is activated, at least one output signal is retrieved from a part of the plurality of light receiving units, the part of the plurality of light receiving units including at least one of the plurality of light receiving units from which at least one output signal is retrieved when at least another one of the plurality of light emitting units is activated.

14. The image reading apparatus according to claim 2, wherein the retrieving procedure is configured such that output signals are retrieved from all of the plurality of light receiving units in response to an activation of one of the plurality of light emitting units, and at least one output signal is retrieved from at least one light receiving unit, which is determined normal by the determination unit, among the plurality of light receiving units in response to an activation of at least another one of the plurality of light emitting units.

15. The image reading apparatus according to claim 2, wherein the retrieving procedure is configured such that output signals are retrieved from all of the plurality of light receiving units in response to an activation of one of the plurality of light emitting units, and, when all of the output signals are determined abnormal by the determination unit, at least one output signal is retrieved from at least one of the plurality of light receiving units in response to an activation of at least another one of the plurality of light emitting units.

16. The image reading apparatus according to claim 2, wherein the retrieving procedure is configured such that, when one of the plurality of light emitting units is activated, output signals are retrieved from a part of the plurality of light receiving units different from another part of the plurality of light receiving units from which output signals are retrieved when at least another one of the plurality of light emitting units is activated, and, when all of the retrieved output signals are determined abnormal by the determination unit, output signals are retrieved both from at least one of the part of the plurality of light receiving units, from which the abnormal output signals have been retrieved, and from a part of the plurality of light receiving units corresponding to a light emitting unit to be activated next among the plurality of light emitting units.

17. The image reading apparatus according to claim 2, wherein each of the plurality of light emitting units irradiates the reading target with a light of each predetermined color.

18. A facsimile apparatus comprising:
the image reading apparatus according to claim 2; and
a transmitter that performs facsimile transmission of image data generated based on output signals from the plurality of light receiving units in the image reading apparatus.

19. A copying apparatus comprising:
the image reading apparatus according to claim 2; and
an image forming apparatus that forms an image based on image data generated based on output signals from the plurality of light receiving units in the image reading apparatus.

* * * * *